United States Patent [19]
Iijima

[11] Patent Number: 5,845,304
[45] Date of Patent: Dec. 1, 1998

[54] DOCUMENT PROCESSING APPARATUS

[75] Inventor: Yukio Iijima, Kanagawa, Japan

[73] Assignee: Fuji Xerox Co., Ltd., Tokyo, Japan

[21] Appl. No.: 631,227

[22] Filed: Apr. 12, 1996

[30] Foreign Application Priority Data

Apr. 20, 1995 [JP] Japan ................................. 7-117735

[51] Int. Cl.⁶ .................................................. G06F 17/21
[52] U.S. Cl. ........................ 707/530; 707/515; 707/516; 707/523
[58] Field of Search .......................... 395/326, 618–619, 395/761, 772, 776–778, 784, 785, 788, 790–793; 707/500, 502, 515, 516, 523, 524, 526, 528, 529, 530, 531, 541, 542; 345/440–443, 112, 179–180

[56] References Cited

U.S. PATENT DOCUMENTS

| | | | |
|---|---|---|---|
| 4,815,029 | 3/1989 | Barker et al. | 707/516 |
| 4,933,880 | 6/1990 | Borgendale et al. | 707/515 |
| 4,956,806 | 9/1990 | Crowe et al. | 395/792 |
| 5,051,930 | 9/1991 | Kuwabara et al. | 707/516 |
| 5,251,314 | 10/1993 | Williams | 707/101 |
| 5,398,308 | 3/1995 | Kato et al. | 345/433 |
| 5,408,599 | 4/1995 | Nomura et al. | 707/516 |
| 5,421,012 | 5/1995 | Khoyi et al. | 395/677 |
| 5,537,546 | 7/1996 | Sauter | 707/501 |
| 5,613,124 | 3/1997 | Atkinson et al. | 395/133 |
| 5,630,117 | 5/1997 | Oren et al. | 395/602 |
| 5,638,504 | 6/1997 | Scott et al. | 395/761 |
| 5,644,692 | 7/1997 | Eick | 395/326 |
| 5,664,208 | 9/1997 | Pavley et al. | 707/515 |
| 5,666,553 | 9/1997 | Crozier | 707/540 |
| 5,669,005 | 9/1997 | Curbow et al. | 707/523 |
| 5,713,031 | 1/1998 | Saito | 707/501 |
| 5,740,455 | 4/1998 | Pavley et al. | 707/515 |

FOREIGN PATENT DOCUMENTS 5-143584  6/1993  Japan .

OTHER PUBLICATIONS

Young et al., WordPerfect 6.1 for Windows for Dummies, 2nd Edition, IDG Books Workdwide, pp. 112–114, 138–140, 1994.

Primary Examiner—Joseph H. Feild
Attorney, Agent, or Firm—Finnegan, Henderson, Farabow, Garrett & Dunner, L.L.P.

[57] ABSTRACT

A plurality of document information is divided into intrinsic data concerning descriptive contents of a document and common data that includes attributes of the descriptive contents, and is stored within a memory. Based on the document processing instructions inputted from an input section, intrinsic data stored within the memory undergoes edit processing with an intrinsic operation unit; also, based on document processing instructions, multiple common data stored within the memory undergoes change processing with a common operation section. These processing results are mutually reflected by a conversion section, and based on this intrinsic data and common data, document images are display on an output display section. Then, a retrieve section, based on the attributes designated by the input section, retrieves, from the memory, document information that possess these attributes, and displays this information on the display section.

19 Claims, 7 Drawing Sheets

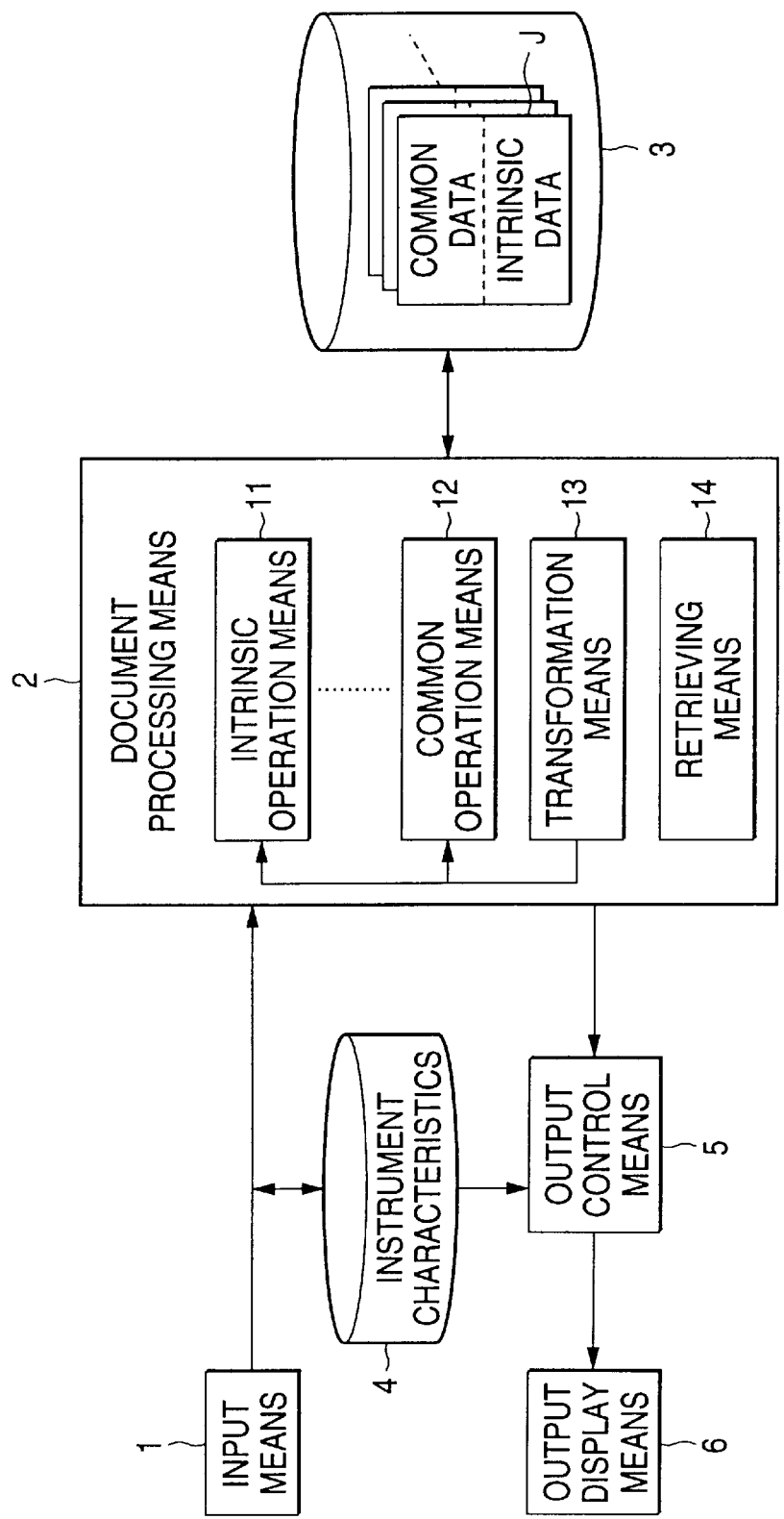

FIG. 2 (a)

|  | IDENTIFIER | VALUE |
|---|---|---|
| COMMON DATA | TYPE | CHARACTER STRING |
|  | NAME | ×△○◇ |
|  | SIZE | (200, 20) |
|  | CREATOR | ○◇×△ |
|  | DATA OF CREATION | 1995. 2. 16 |
|  | KEYWORD | ×△△ |
|  | COLOR | RED |
|  | THICKNESS OF LINE | THICK |
| INTRINSIC DATA | FONT INFORMATION | ×△○◇ |
|  | CHARACTER STRING | abcde |

FIG. 2 (b)

|  | IDENTIFIER | VALUE |
|---|---|---|
| COMMON DATA | TYPE | LINE FIGURE |
|  | NAME | △×○ |
|  | SIZE | (10, 10) |
|  | CREATOR | ○◇×△ |
|  | DATA OF CREATION | 1995. 2. 16 |
|  | KEYWORD | ××△ |
|  | COLOR | RED |
|  | THICKNESS OF LINE | THIN |
| INTRINSIC DATA | SET OF LINE SEGMENT | { (0, 0) (5, 0) (10, 5) (10, 10) } |

FIG. 5 (a)
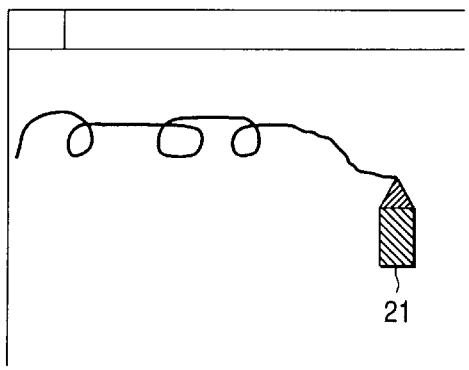
21
FIG. 5 (b)
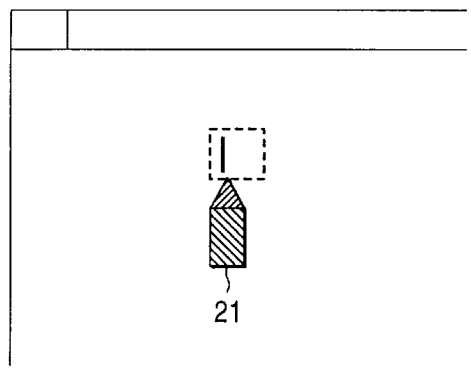
21
FIG. 6
| COMMON ATTRIBUTE SETTING SHEET |
| --- |
| LINE THICKNESS<br>☑ THIN ☐ THICK |
| COLOR<br>☑ BLACK ☐ RED ☐ BLUE |
WHEN LINE THICKNESS IS MADE "THICK," ···  →
| COMMON ATTRIBUTE SETTING SHEET |
| --- |
| LINE THICKNESS<br>☐ THIN ☑ THICK |
| COLOR<br>☑ BLACK ☐ RED ☐ BLUE |
LINE FIGURE BECOMES THICK LINE  →
CHARACTER BECOMES THICK CHARACTER
a b c d e  →  a b c d e

FIG. 8

"LONG, LONG AGO, A GRANDFATHER AND A GRANDMOTHER RIBED IN A CERTAIN VILLAGE. ONE DAY, THE GRANDFATHER WENT TO THE MOUNTAIN TO GOTHER FIRWOOD, WHILE THE GRANDMOTHER WENT TO THE RIVER TO WOSH THEIR CLOTHES."

THE ENTIRE OF LINE FIGURES AND CHARACTER STRINGS CAN BE RETRIEVED BY LINE THICKNESS = "THICK"

GOTHER FIRWOOD

WOSH

DOCUMENT PROCESSING APPARATUS

BACKGROUND OF THE INVENTION

The present invention relates to a document processing apparatus for handling groups of document data as units and more particularly to such type of apparatus that realizes a uniform processing according to the attributes of the document data units even where the grouped data units are of different data formats such as character strings, graphics and the like.

For document processing apparatuses that perform document processing such as the editing and the like of electronic document data, in case where such apparatuses handle document data in different formats, such as character strings, graphics, etc., it is necessary to perform document processing of document data using different operational methods (data processing application programs) according to each separate data format. As a result, when document data units of different formats are collected together into single document data, for example, in case where a single document has been configured that is comprised of character-string document elements and graphic document elements, unless different operational methods are started up for each separate document element, such things as changing the layout, etc., of document elements could not be performed.

Under these circumstances, a document processing apparatus has been proposed that can perform by using a common operational method move processing, etc., of document elements comprised of different data formats (Japanese Patent Unexamined Publication No. Hei. 5-143584). With this document processing apparatus, character-string format document-element data and non-character-string format document-element data are retained in separate memory sections, respectively, and at the same time, control data showing the sizes and margins of these document elements are further collected and retained in separate control data memory sections, and the movement, etc., of document elements can be performed through common operations on the control data memory sections.

Here, when considering how paper-medium documents are used, for example, for document elements included in a document that are highly significant, a line marker, etc., is used to change the color of characters and the color of graphic lines to red, etc. It is desirable that this type of process could also be realized for electronic documents in the same manner as in the case of the paper-medium documents.

However, with the conventional document processing apparatuses, since processing of attribute data concerning the descriptive contents of a document such as the color of lines could not be performed using common operations, in the case where one wants to change the color of characters and the color of graphic lines, processing must be performed using different operations according to various data formats of document elements; in order to realize color changes, processing must be executed that is complicated and that requires a long time.

Also, the same can be said for the thickness of lines: for example, it would be convenient if one could change highly significant document elements included within a document, such as being able to change those elements described as thick-lined characters and graphic lines. However, with previous document processing apparatuses, just as described above, difficult processing must be executed, and the use of these kinds of electronic documents has not been easily realized.

Also, as described above, since the descriptive contents of documents such as the color and thickness of lines are described as significant, etc., then from this perspective, it would be convenient to be able to perform retrieval processing for these significant portions. However, no conventional document processing apparatus has been able to realize such retrieval processing of electronic documents.

SUMMARY OF THE INVENTION

The present invention takes into account the above-described circumstances. A first object of the invention is to provide a document processing apparatus that can change, using common operational methods, the attributes of described contents of documents such as the color and thickness of lines, and that can change speedily and easily the display format of such things as the color and thickness of character lines and graphic lines included in electronic documents.

A second object of the invention is to provide a document processing apparatus for realizing the edit processing of documents according to the characteristics of writing instruments.

A third object of the invention is to provide a document processing apparatus for executing retrieval processing based on attributes concerning the descriptive contents of documents.

In order to accomplish the above-described objects, the document processing apparatus according to a first aspect is comprised of memory means for storing separately a plurality of document information pieces including a pair of intrinsic data as to the descriptive contents of a document, and common data that includes attributes of the just-mentioned descriptive contents; an input means for inputting document processing instructions; a plurality of intrinsic operation means for edit processing of intrinsic data stored in the memory means based on the document processing instructions; common operation means for common change processing of multiple common data stored in the memory means based on the document processing instructions; conversion means for, together with the processing of the intrinsic operation means or the common operation means, starting up the common operation means or the intrinsic operation means and for reflecting within intrinsic data or within common data the results of converting common data or the results of editing intrinsic data; and display means for displaying document images based on common data and intrinsic data read out from the memory means.

A document processing apparatus according to a second aspect of the invention further comprises writing instrument characteristic memory means within the document processing apparatus described in the document processing apparatus of the first aspect for storing the characteristics for describing document contents, at the very least the thickness and color of lines. The common operation means, based on the writing instrument characteristics designated by the input means, changes attribute data concerning the color and thickness of lines found within the common data.

A document processing apparatus according to a third aspect of the invention further comprises retrieving means within the document processing apparatus of the first or second aspect for retrieving, based on the attributes designated by the input means, within the memory means for document information that has these attributes, and for display output of these to the display means.

With the document processing apparatus of the first aspect, for document information that possesses descriptive contents such as character strings and graphics, etc., in the case where such descriptive contents are to be edited, intrinsic data (character-string data and graphics data, etc.) concerning these descriptive contents is processed using the intrinsic operation means according to each respective data format. Conversely, in the case where the color of character and graphic lines that comprise this descriptive data is to be changed, common data that includes the descriptive content attributes is processed using the common operation means. Here, since each document information attribute datum is stored in the memory means as common data and separated from intrinsic data, such data is in a data format that does not rely on the format of the intrinsic data. Therefore, the common operation means can perform common change processing of the attributes of each document information.

Based on these intrinsic data and common data, by displaying document images on the display means, document images wherein the descriptive contents of the document are changed, or wherein such things as the color, etc., of descriptive content lines are changed, are displayed.

Also, with the document processing apparatus of the second aspect, attributes that describe document contents, at the very least the thickness and color of lines, can be preset as writing instrument characteristics. By selectively designating these attributes by the input means, the user can easily change the thickness and color of the lines of the document descriptive contents.

Also, since common data does not rely on the data format of a document, such common data can become the object of a common retrieval within and among each document. Here, with the document processing apparatus of the third aspect, the attributes of this common data become the object of a retrieval by the retrieving means; for example, character-string portions described as "thick lines" and graphics portions described as "red-colored lines" can be retrieved for and found within the document.

BRIEF DESCRIPTION OF THE INVENTION

FIG. 1 is a block diagram showing the structure of a document processing apparatus according to one embodiment of the present invention.

FIGS. 2(a) and 2(b) are illustrative views showing an example of the data contents of a character document and a graphics document.

FIGS. 5(a) and 5(b) are illustrative views showing a display by a writing instrument on the screen.

FIG. 6 is an illustrative view showing diagram operations resulting from an attribute data change.

Figure 7:
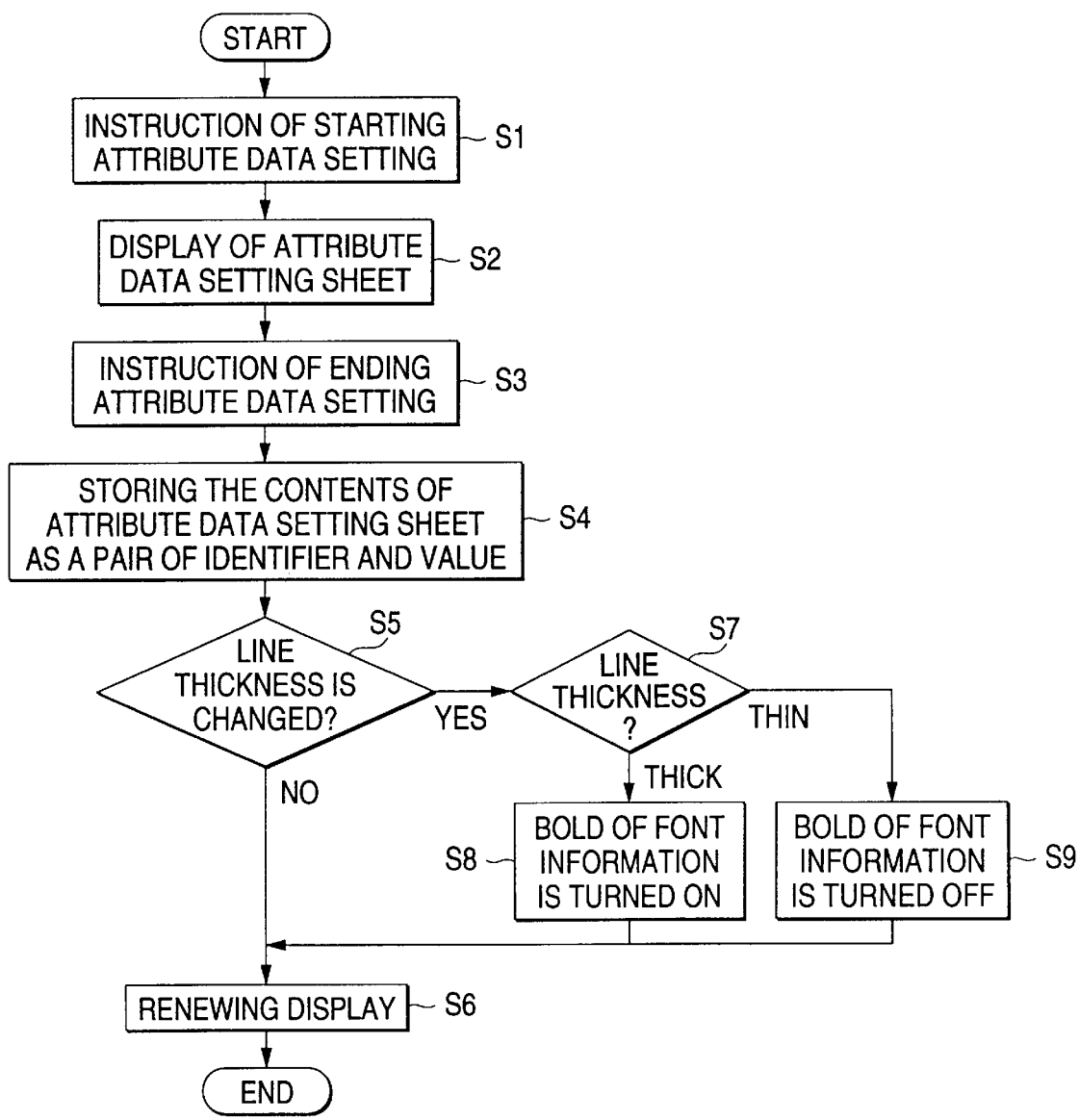

FIG. 7 is a flow chart showing an attribute data setting procedure.

FIG. 8 is an illustrative view showing a retrieving operation.

DETAILED DESCRIPTION OF THE PREFERRED EMBODIMENTS

A preferred embodiment of the document processing apparatus of the present invention will now be explained by referring to the accompanying drawings.

As shown in FIG. 1, the document processing apparatus of this embodiment is comprised of input means 1 comprised of a mouse and a keyboard, etc., document processing means 2 for performing each type of document processing based on the document processing instructions inputted by the input means 1, memory means 3 for storing a plurality of document information J that becomes the object to be processed by the document processing means 2, writing instrument characteristics memory means 4 that stores writing instrument characteristics for describing document contents, output control means 5 for output processing of writing instrument characteristics and document information J, and output display means 6 for displaying a pen case, etc., for showing writing instrument characteristics and document images based on information that has been processed.

Documents that are the object of this embodiment contain single document data that is a collection of document data units with different data formats; they are single documents comprised of a merger of character-string document elements comprised of character data, and line-graphics document elements comprised of line-graphics data. Thus, these character-string document elements and line-graphics document elements are each stored separately as document information J within the memory means 3. The output control means 5 takes each of the layers of this document information J and makes images with these; through an overlapping display of these images, the output control means 5 causes the output display means 6 to display document images that are a merger of character-string document elements and line-graphics document elements.

Document information J comprised of character-string document elements and line-graphics document elements that are to be stored within the memory means 3 possesses the contents shown respectively in FIG. 2(a) and FIG. 2(b). Each set of document data J possesses intrinsic data that rely on the application programs that created each relevant document element, as well as common data in a data format that does not rely on such application programs.

Document information J comprised of character-string document elements possess as intrinsic data character-string data, "abcde", and font data, "x∆o◇"; based on this intrinsic data, the descriptive contents of document elements are displayed as images. Document information J comprised of character-string document elements also possess as common data attribute data relating to the data type, "character-string"; the information file name "x∆o◇"; the size of the document elements, "200, 20"; the creator's name, "o◇x∆"; the date of creation, "1995.2.16"; a keyword "x∆∆"; a character color, "red"; and the thickness of character lines, "thick". The descriptive contents "abcde" of character-string document elements especially reflect attribute data related to color and line thickness for display as images.

Document information J comprised of line-graphics document elements possess as intrinsic data line inflection-point set data, "(0,0), (5,0), (10,5), (10,10)"; based on this intrinsic data, the descriptive contents of line-graphics document elements are displayed as images. Document information J comprised of line-graphics document elements also possess as common data attribute data relating to the data type, "line-graphics"; the information file name "∆xo"; the size of the document elements, "10, 10"; the creator's name, "o◇x∆"; the date of creation, "1995.2.16"; a keyword "xx∆"; a character color, "red"; and the thickness of character lines, "thin". The descriptive contents of line-graphics document elements especially reflect attribute data related to color and line thickness for display as images.

The above-described document processing means 2 is comprised of multiple intrinsic operation means 11 for performing edit processing of the intrinsic data of each set of document information J, common operation means 12 for performing common (uniform) change processing for the common data of each set of document information J, a transformation means 13 for reflecting intrinsic data or common data corresponding to the processing results of the intrinsic operation means 11 or the common operation means 12, and retrieving means 14 for performing retrieval processing based on the common data of each set of document information J.

The intrinsic operation means 11 is comprised of document application programs; multiple programs are prepared to respond to the data formats of intrinsic data that are the object of processing. These intrinsic operation means 11, based on the document processing instructions from the input means 1, perform edit processing of the corresponding intrinsic data of document information J stored within the memory means 3. For example, these intrinsic operation means 11 change such things as the character strings and line graphics of the descriptive contents, change the font for inputting characters, or change the thicknesses of lines to rewrite line graphics.

The common operation means 12 is comprised of a basic document processing program that can perform change processing of common data from any part of document information J. Therefore, based on the document processing instructions from the input means 1, the common operation means 12 performs change processing of the corresponding common data of document information J stored within the memory means 3. For example, it changes the colors of characters and lines, or it changes the thicknesses of characters and lines.

Figure 3:
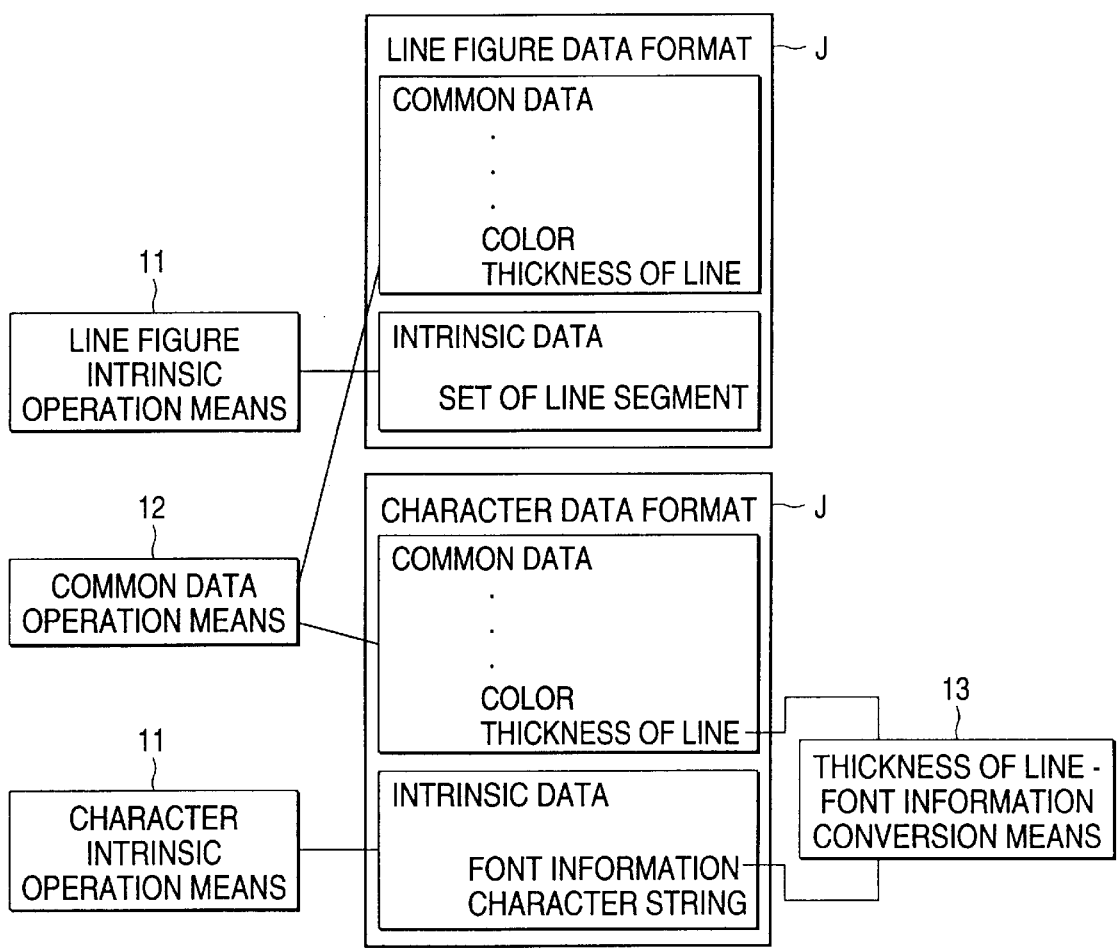
FIG. 3 is a conceptual view illustrating processings with operation means and conversion means.

The relationship between this type of intrinsic operation means 11 and the common operation means 12 is shown in FIG. 3. Edit processing corresponding to each of the data formats of intrinsic data with different formats is performed with the intrinsic operation means 11; common (uniform) change processing of common data is performed with the common operation means 12 regardless of the format of intrinsic data.

The conversion means 13, together with the processing of the above-described intrinsic operation means 11 or the common operation means 12, performs the start-up processing of the common operation means 12 or of the intrinsic operation means 11, and causes the processing results for intrinsic data or common data to be reflected onto other data. For example, in the case where the intrinsic operation means 11 has changed the color of characters and rewritten them, the common operation means 12 is started up, and it rewrites to the changed color the color attributes of common data; in the case where the thickness of character lines has been changed with the common operation means 12, the intrinsic operation means is started up, and it rewrites font information.

The retrieving means 14 performs retrieval processing on the common data of each set of document information J. Based on the attributes inputted from the input means 1, the retrieving means 14 extracts data that possess these attributes from the document information J stored within the memory means 3, sends this data to the display control means 5, and causes this data to be displayed on the display screen of the output display means 6.

With the above described document processing apparatus, when a document processing instruction for editing the descriptive contents of document elements is inputted from the input means 1, the corresponding intrinsic operation means 11 is started up, and it reads out corresponding intrinsic data from document information J that is stored within the memory means 3; it then edit processes this intrinsic data of document information J according to the instructions. Then, this edited document information J passes through the output control means 5 and is displayed on the output display means 6; at the same time, the original information within the memory means 3 is renewed and stored again.

Figure 4:
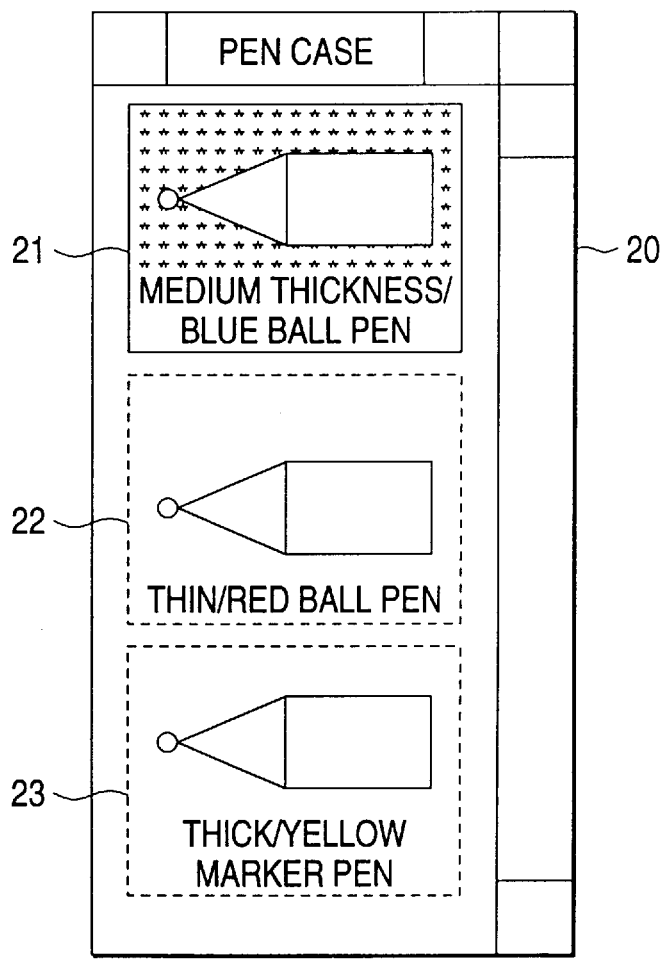
FIG. 4 is an illustrative view showing an example of a pen case.

With this embodiment, when inputting this document processing instruction, the writing instrument characteristics preset from the writing instrument characteristics memory means 4 is read out with the output control means 5, and displayed on the output display means 6. As shown in FIG. 4, the display of these writing instrument characteristics is performed by displaying a pen case 20 in a corner of the display screen. When the user selects one of the writing instruments 21, 22, or 23 from the displayed pen case 20 and inputs a document processing instruction, editing of the document elements is performed according to the color and line thickness of the writing instrument selected.

In other words, in the case where the writing instrument 21 has been selected, characters and line-images are written with blue lines of medium thickness; in the case where the writing instrument 22 has been selected, characters and line-images are written with thin red lines; and in the case where the writing instrument 23 has been selected, characters and line-images are written with thick, yellow lines.

Also, with this embodiment, as shown in FIGS. 5(a) and 5(b), by selecting a writing instrument, the image mark (icon) of that writing instrument is displayed within the document creation domain of the display screen. For example, in the case where line-graphics are to be written by selecting the writing instrument 21, as shown in FIG. 5(a), the display is just as if this writing instrument 21 itself were writing the line graphics; in the case where characters are to be written by selecting the writing instrument 21, as shown in FIG. 5(b), this writing instrument is displayed in the calotte portion at the character input position.

Also, when a document processing instruction for changing the common data of character elements is inputted from the input means 1, the common operation means 12 is started up, and it reads out corresponding common data from document information J that is stored within the memory means 3; it then changes the attributes of this common data according to the instructions. Then, this changed common data is reflected onto the corresponding intrinsic data, and the document information J comprised of these data passes through the output control means 5 and is displayed on the output display means 6; at the same time, the original information within the memory means 3 is renewed and stored again.

With this embodiment, when inputting this document processing instruction, as shown in FIG. 6, the common attribute setting sheet is displayed on the display screen. When the thickness and color of lines are set with this sheet, the display formats of line graphics and character strings are changed according to these settings. For example, when the "line thickness" setting is set at "thick", graphic lines are changed to thick lines, and character strings are changed to "thick" (bold) characters.

The concrete processing procedures for this are shown in FIG. 7. When an attribute data setting "start" instruction is inputted from the input means 1 (step S1), the output control means 5 displays the attribute data setting sheet on the screen of the output display means 6 (step S2), which receives the change of the attribute data inputted by the user from the input means 1. Then, when an "end" attribute data setting instruction is received from the input means 1 (step S3), the common operation means 12 temporarily memorizes (stores) within its own buffer the identifiers "color" and "line thickness" inputted with the attribute setting sheet, and the values "red", "thick", etc. (step S4), and determines whether or not each attribute data "color" and "line thickness" has had its settings changed (step S5).

As a result, in the case where "color" has been the setting changed, the common operation means 12 changes the color attributes of common data to the setting value, and, based on this changed data, the output control means 5 renews the document images displayed on the output display means 6 (step S6). Conversely, in the case where "line thickness" has been changed, the common operation means 12 determines whether the line thickness setting is "thin" or "thick" (step S7). In the case where the setting is "thick", the line thickness attribute of common data is changed to the "thick" setting value (step S8). In the case where the setting is "thin", the line thickness attribute of common data is changed to the "thin" setting value (step S9). Based on this changed data, the output control means 5 renews the document images displayed on the output display means 6 (step S6).

Moreover, change of attribute data may be performed only for document elements designated by the input means 1; however, when no document elements have been especially designated, the common operation means 12 may be made to change, according to the setting, attribute data included within all of the common data of document information J that is stored within the memory means 3.

Also, when document processing instructions for setting attributes from the input means 1 for performing document retrieves are inputted, the retrieving means 14 is started up, and it retrieves the common data of document information J that is stored within the memory means 3, and displays retrieved results to the screen of the output display means 6 via the output control means 5. In other words, if the user designates as attributes the color and thickness of common data, the document elements that possess the designated attributes will be displayed.

For example, for the merged document shown in FIG. 8 that is comprised of a "thin"-character character-string document element, "Long, long ago . . . to their clothes", and the "thick"-character character-strings (in bold) "gather firewood" and "wash", as well as the thin-line line-graphics document elements, "certain village" (which has been circled with a thin line) and "gother firwood" (which has been underlined with a thin line), and the thick-line line-graphics document elements, "ribed" (which has been underlined with a thick line) and "wosh" (which has been circled with a thick line), when a retrieve processing instruction "thick" for the attribute line thickness is inputted, document elements that possess thick-line attribute data will be selected, and, as shown in the same diagram, the thick-line underline of "ribed", the thick-character (bold) character-string "gother firwood", the thick-character (bold) character-string "wosh", as well as the thick-line circle surrounding "wosh" will be retrieved out and displayed on the screen of the output display means 6.

As explained in detail above, with the invention of the first aspect, since the attributes of the color and thickness of the lines of descriptive contents within a diagram can be changed with common operation means, the display format such as the colors and thicknesses of characters and graphic lines within an electronic document can be easily and speedily changed, thereby improving the convenience of using electronic documents.

Also, with the invention of the second aspect, since the characteristics of writing instruments for describing document contents are pre-set, edit processing of documents according to the writing instrument characteristics can be performed, and the handling of electronic documents in the same way as paper-medium documents can be realized.

Also, with the invention of the third aspect, since retrieval processing can be performed based on attributes concerning document descriptive elements, retrievals can be performed based on special characteristics that describe essential items, etc., of a document, including the color and thickness, etc., of lines of the descriptive contents of a document, thereby expanding the use form of electronic documents.

What is claimed is:

1. A document processing apparatus for processing a document comprised of plural kinds of document elements having data of different formats, said document processing apparatus comprising:

memory means for storing document element data including common data comprised of attributes common to the plural kinds of document elements having different data formats, and intrinsic data intrinsic to the respective document element for each of the document elements;

input means for inputting document processing instructions;

common operation means for editing the common data of the document elements stored in the memory means on the basis of the document processing instructions inputted from the input means for the common data of the document elements;

a plurality of intrinsic operation means provided for the respective kinds of document elements to edit the intrinsic data of the document elements stored in the memory means on the basis of the document processing instructions inputted from the input means for the intrinsic data of the document elements;

conversion means for reflecting a result of edition of the intrinsic data of the document elements edited by the intrinsic operation means into the common data of the document elements, and for reflecting a result of edition of the common data of the document elements edited by the common operation means into the intrinsic data of the document elements; and display means for displaying the respective document elements on the basis of the common data and intrinsic data of the document elements stored in the memory means.

2. A document processing apparatus as claimed in claim 1, wherein the document includes a document element of character strings and a document element of graphics.

3. A document processing apparatus as claimed in claim 2, wherein the common data includes attribute data as to a color of the document element and/or a thickness of a line.

4. A document processing apparatus as claimed in claim 3, wherein the intrinsic data of the document element of the character strings include font information and character string data.

5. A document processing apparatus as claimed in claim 4, wherein the display means displays the character strings generated on the basis of the font information and the character string data of the intrinsic data, with the color set in the attribute data of the common data.

6. A document processing apparatus as claimed in claim 3, wherein the intrinsic data of the document element of a linear graph includes coordinate data of an inflection point of a line.

7. A document processing apparatus as claimed in claim 6, wherein the display means displays a graph generated on the basis of the coordinate data of the inflection point of the line of the intrinsic data, with the color and the thickness of a line set in the attribute data of the common data.

8. A document processing apparatus as claimed in claim 6, wherein the intrinsic operation means of a graphic document element inputs a graph while specifying the thickness and color of a line, and stores the coordinate data of the inflection point of the line of the input graph as the intrinsic data of the document element.

9. A document processing apparatus as claimed in claim 8, further comprising:

writing instrument characteristic memory means for storing characteristics of thickness and color of lines of plural kinds of writing instruments, wherein the intrinsic operation means inputs a graph by using the thickness and color of lines of the writing instrument selected from the writing instrument characteristic memory means.

10. A document processing apparatus as claimed in claim 9, wherein the display means displays a selected writing instrument.

11. A document processing apparatus as claimed in claim 4, wherein:

the intrinsic operation means of the document element of the character strings inputs character strings while specifying the color and the thickness of a line, and stores character string font information corresponding to the specified line thickness and data of the input character strings; and the conversion means reflects the thickness and color of a line specified by the intrinsic operation means into the attribute data as to the color and thickness of a line in the common data.

12. A document processing apparatus as claimed in claim 8, further comprising:

writing instrument characteristic memory means for storing characteristics of thickness and color of lines of plural kinds of writing instruments, wherein the intrinsic operation means inputs the character strings by using the thickness and color of the line of the writing instrument characteristic memory means.

13. A document processing apparatus as claimed in claim 12, wherein the display means displays a selected writing instrument.

14. A document processing apparatus as claimed in claim 4, wherein the common operation means specifies the color and thickness of lines in the character string document element, and stores the attribute data of the color of thickness of lines of the specified document element as the common data of the document element, and the conversion means reflects the attribute data relating to the thickness of lines of the common data into the font information of the intrinsic data of the document element.

15. A document processing apparatus as claimed in claim 14, wherein the font information is information indicating on or off of a boldface.

16. A document processing apparatus as claimed in claim 3, wherein the common operation means specifies the color and thickness of lines in the graphic document element, and stores the attribute data of the color or thickness of lines in the specified graphic document element as the common data of the graphic document element.

17. A document processing apparatus as claimed in claim 1, wherein the common operation means specifies a plurality of document elements and edits the common data of the respective document elements concurrently.

18. A document processing apparatus as claimed in claim 1, further comprising:

retrieving means for retrieving, from the common data, the document elements satisfying a retrieving condition in accordance with a retrieving instruction inputted from the input means, wherein the display means displays the document element retrieved by the retrieving means.

19. A document processing apparatus as claimed in claim 18, the retrieving means retrieves a graphic document element and a character string document element having the thickness of an input line, and the display means displays only the retrieved graphic document element and the character string document element.

* * * * *

UNITED STATES PATENT AND TRADEMARK OFFICE
CERTIFICATE OF CORRECTION

PATENT NO. : 5,845,304
DATED : December 1, 1998
INVENTOR(S) : Yukio IIJIMA

It is certified that error appears in the above-identified patent and that said Letters Patent is hereby corrected as shown below:

Title Page, Item [57], in the Abstract, lines 12-13, "display" should read --displayed--.

Title Page, Item [57], in the Abstract, line 16, "possess" should read --possesses--.

Claim 12, Col. 9, lines 41-42, "claim 8" should read --claim 4--.

Signed and Sealed this

Thirty-first Day of August, 1999

Attest:

Q. TODD DICKINSON

*Attesting Officer*  *Acting Commissioner of Patents and Trademarks*